Patented Apr. 30, 1929.

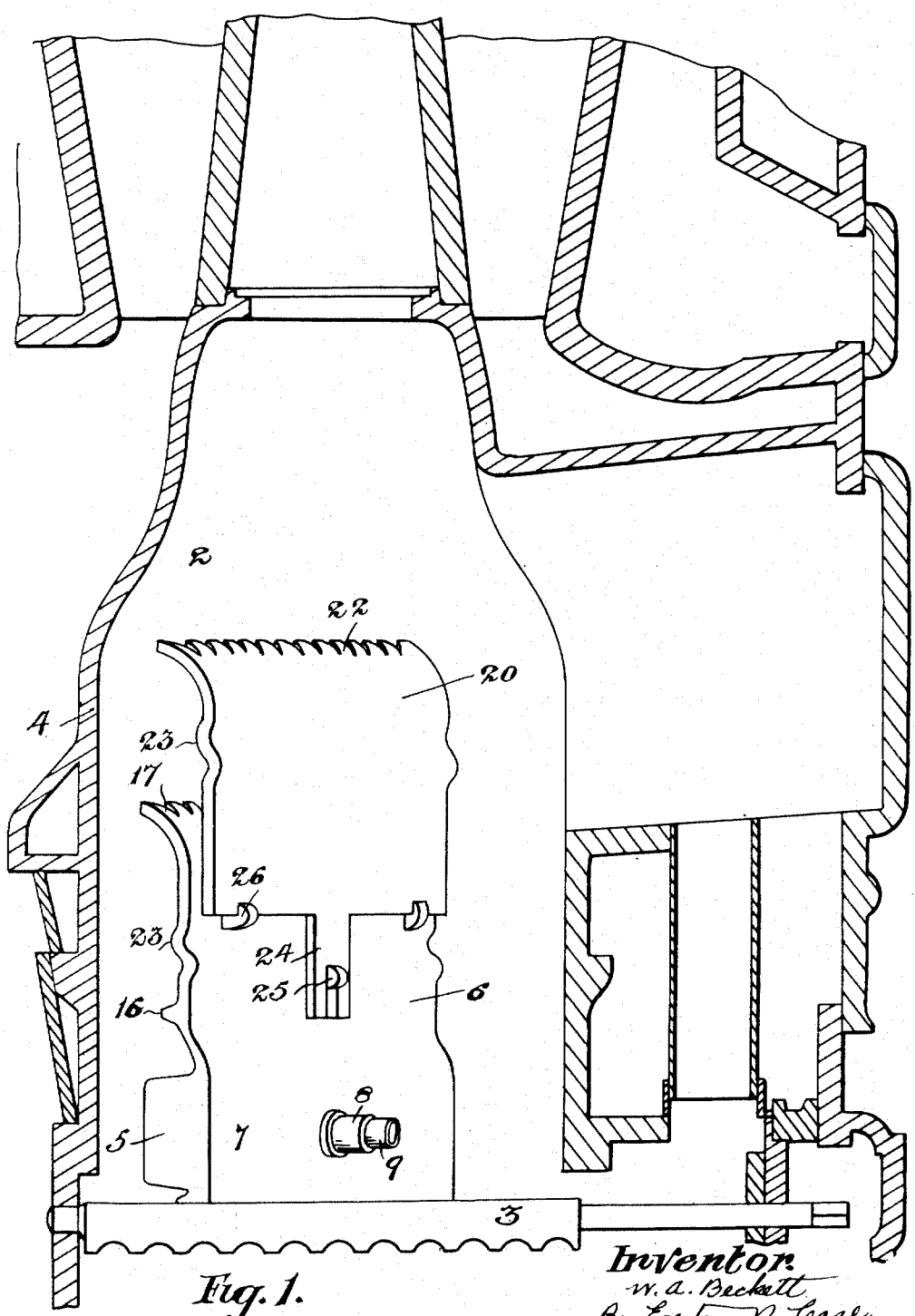

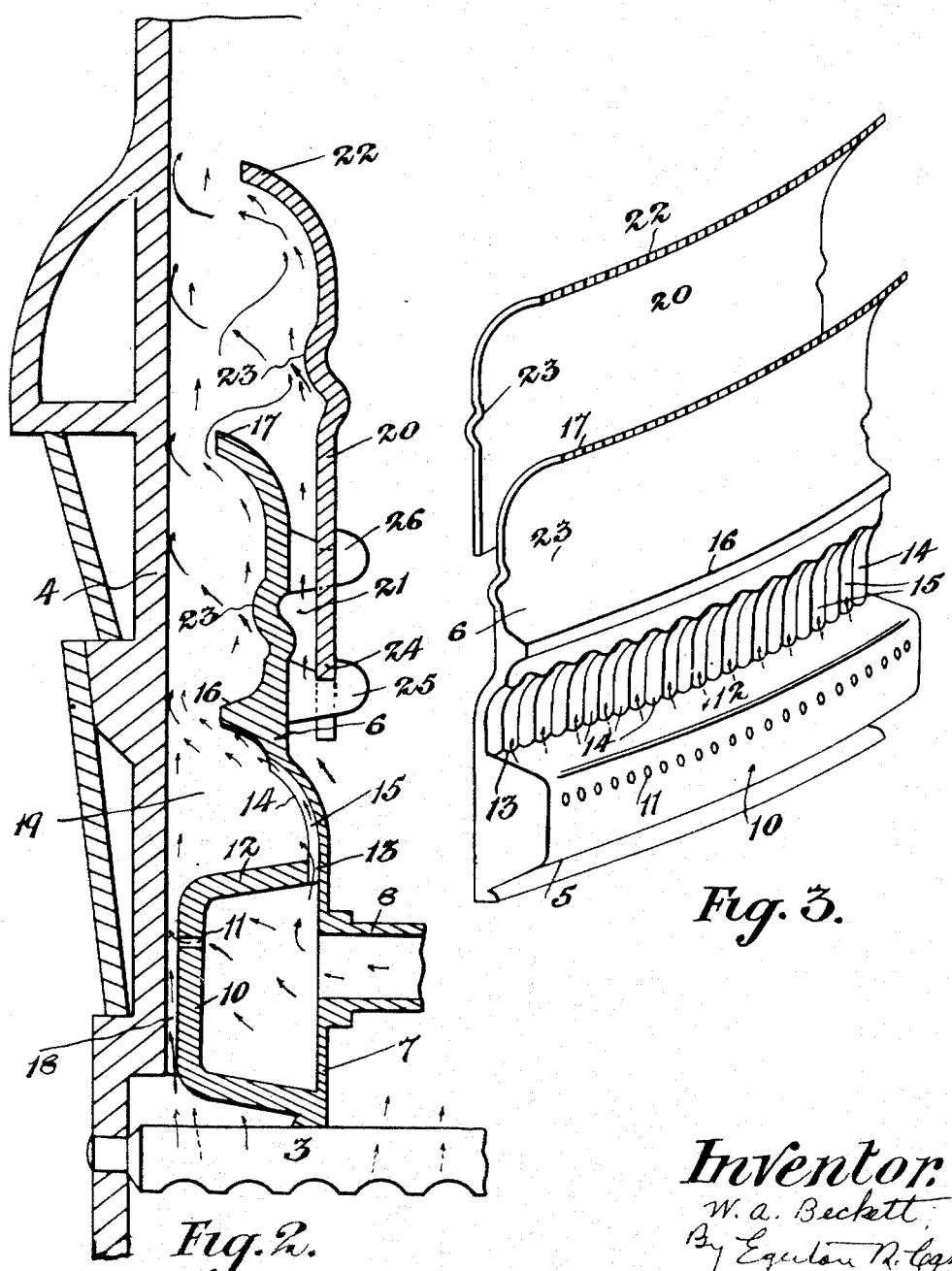

1,710,964

UNITED STATES PATENT OFFICE.

WILLIAM AUSTIN BECKETT, OF KINGSVILLE, ONTARIO, CANADA.

GAS BURNER.

Application filed January 31, 1928. Serial No. 250,798.

My invention relates to improvements in gas burners, and relates more particularly to that type of gas burner which can be mounted in the fire pot of hot-air, hot-water, and steam, furnaces, as well as in stoves, and the principal object of the invention is to provide a gas burner to produce the maximum of heat under low gas pressure so located within the fire pot of any suitable type of stove or furnace (hot-air; hot-water, or steam, furnaces) that if the burner be not used, the type of fuel the stove or furnace is adapted to burn may be burned therein with my gas burner in the fire pot thereof, and without interfering in any manner whatsoever with the functioning of the burner when it is again put to use, and in the following specification and the drawings forming part thereof, I shall describe and illustrate my preferred construction, and what I claim as new will be set forth in the claims forming part of this specification.

Fig. 1 is a vertical central section through a conventional type of hot-air furnace, showing one of my gas burners mounted in the fire pot thereof. Fig. 2 is a vertical section through one of my gas burners, and through a portion of the wall of a fire pot, and Fig. 3 is a perspective view of the outer side of one of my gas burners.

In the drawings, like characters of reference refer to the same parts.

At the outset it must be understood that although I have specifically mentioned gas as the fuel used with my burner, it must be distinctly understood that oil may be burned in my burner.

In my experiments, I have found that the gas flame must be brought and kept in positive contact with the walls of the fire pot to keep same heated to the required degree (cherry red) if the maximum heat is to be obtained from the fuel used.

2 is any suitable fire pot which is provided with any suitable type of grate bars 3. Air enters this fire pot in any well-known manner not germane to this invention, and the waste products of combustion pass out of the furnace in any well-known manner. I prefer to use a plurality of gas burners of the particular construction hereinafter described, and position same within the fire pot 2 so that they will be in close proximity to the walls 4 of said fire pot. Since said fire pot is usually circular in horizontal section, the said gas burner will be formed segmental in shape as is clearly illustrated in Fig. 3.

Each gas burner embraces a gas manifold 5 and a baffle plate 6 located thereabove and overhanging said manifold. The inner wall 7 of the gas manifold is provided with a suitable coupling 8 for the gas pipe 9, and in the outer wall 10 of said gas manifold is formed a plurality of orifices 11 through which the gas and air passes, as of course it will be understood that any suitable type of air mixer (not shown) is combined with the gas pipe 9.

Formed in the top wall 12 of the gas manifold is a plurality of orifices 13, and integrally formed with the lower portion of the baffle plate 6 are spaced ribs 14 which form channels 15 therebetween each in communication with an orifice 13. The lower portion of said baffle plate 6 is curved outwardly and upwardly and consequently the ribs 14 conform to this shape, and the gas and air escaping through the orifices 13 are deflected against the wall 4 as shown clearly in Fig. 2. To further insure the deflection of said gas and air to bring it intimately into contact with said wall 4, I provide the baffle plate 6 on its outer side with a deflector 16 the underside of which is curved appropriately. The upper end of the baffle plate 6 is curved outwardly as shown at 17 to deflect the gas and air into contact with the wall 4, and it will be noticed upon referring particularly to Fig. 1 that the said upper end is serrated so as to facilitate combustion.

As before-mentioned, air will enter the ash pit below the grate bars 3 in any well-known manner, and this air will pass into a flue 18 formed between the gas manifold and a portion of the wall of the fire pot. This air will pass into a flue 19 formed between the baffle plate 6 and the wall of the fire pot, to facilitate combustion.

To compel the ascending burning gas and air to come intimately into contact with the wall 4 above the baffle plate 6, I provide another baffle plate 20 removably supported by the baffle plate 6 in any suitable manner so as to form a flue 21 therebetween to permit a current of air to flow between said baffle plates. The upper end 22 of the said baffle plate 20 is shaped the same as the upper end 17 of the baffle plate 6, and therefore as is shown clearly in Fig. 2, the burning gases above the baffle plate 6 are brought intimately into contact with the walls of the fire pot.

To insure that the burning gases will impinge through deflection against the walls of the fire pot substantially at all points opposite the baffle plates 6 and 20, I provide each baffle plate with a deflecting rib 23. The deflecting rib 23 of the baffle plate 20 is located above the upper end 17 of the baffle plate 6.

It of course will be understood that the gases escaping from the orifices 11 and 13 are burning, and as the spaces between the said baffle plates and the walls of the fire pot form flues, substantially the whole inner surface of the walls of the fire pot will be bombarded by the deflected currents of burning gas with the result that the walls of this fire pot will be heated to a cherry red, and consequently there will not be the same loss of heat through the flue as obviously there would be if the walls of the fire pot were not heated to the extent mentioned. I find that I get the maximum efficiency from my gas burner when the walls of the fire pot are heated throughout.

The action of the baffle plate 20 is in effect that of a booster, because without its use the ascending currents of burning gas above the baffle plate 6 would not be caused to impinge against the walls of the fire pot.

Any suitable means may be employed to support the baffle plate 20 from the baffle plate 6: a convenient means for this purpose embraces a slotted tongue 24 depending below the baffle plate 20 substantially centrally thereof, and this slotted tongue straddles a hook 25 integrally formed with the baffle plate 6. Also integrally formed with said baffle plate 6 are a pair of hooks 26 located one at each side of the tongue 24 and in which rests the lower edge of the baffle plate 20.

Various changes in details of construction may be made without departing from the spirit of my invention.

What I claim as my invention is:

1. A gas burner embracing a manifold provided in its outer and top walls with orifices; a baffle plate projecting above said gas manifold and shaped on its outer side to deflect outwardly therefrom ascending currents of burning gas escaping through the orifices formed in the top wall of said manifold, and another baffle plate removably supported at the inner side of said first-mentioned baffle plate and spaced apart therefrom.

2. A gas burner embracing a manifold provided in its outer and top walls with orifices; a baffle plate projecting above said gas manifold and shaped on its outer side to deflect outwardly therefrom ascending currents of burning gas escaping through the orifices formed in the said top wall, said latter orifices being located adjacent the lower portion of said baffle plate and opening into outwardly curved channels formed between correspondingly-shaped ribs integrally formed with the lower portion of said baffle plate, and means integrally formed with said baffle plate for the purpose of deflecting outwardly therefrom burning gases passing upwardly through said channels.

3. The combination with a fire pot of a furnace, of a segmental shaped gas-burner located close to the walls of said fire pot so as to form flues therewith, embracing a manifold provided in its outer and top walls with orifices; a baffle plate projecting above said gas manifold and shaped on its outer side to deflect outwardly therefrom into contact with the walls of said fire pot ascending currents of burning gas escaping through the said orifices, and a baffle plate removably supported in spaced relation to said first-mentioned baffle plate, and extending well thereabove.

WILLIAM AUSTIN BECKETT.